(12) United States Patent
Shkolnikov

(10) Patent No.: US 8,020,504 B2
(45) Date of Patent: Sep. 20, 2011

(54) STRUCTURAL COMPONENT FOR PRODUCING SHIP HULLS, SHIP HULLS CONTAINING THE SAME, AND METHOD OF MANUFACTURING THE SAME

(75) Inventor: Vladimir M. Shkolnikov, Johnstown, PA (US)

(73) Assignees: Beltran, Inc., Brooklyn, NY (US), part interest; CTC, Johnston, PA (US), part interest ( * ) Notice: Subject to any disclaimer, the term of this patent is extended or adjusted under 35 U.S.C. 154(b) by 0 days.

(21) Appl. No.: 12/656,117

(22) Filed: Jan. 19, 2010

(65) Prior Publication Data

US 2011/0174211 A1    Jul. 21, 2011

(51) Int. Cl.
*B63B 1/38* (2006.01)

(52) U.S. Cl. .................................................. 114/67 R
(58) Field of Classification Search ................. 114/67 R
See application file for complete search history.

(56) References Cited

U.S. PATENT DOCUMENTS

| | | | | |
|---|---|---|---|---|
| 5,088,432 A | * | 2/1992 | Usami et al. | 204/196.3 |
| 5,225,812 A | * | 7/1993 | Faghri | 340/605 |
| 5,820,737 A | * | 10/1998 | Kohn | 204/196.3 |
| 7,412,938 B2 | * | 8/2008 | Hodes et al. | 114/67 R |
| 2007/0281562 A1 | * | 12/2007 | Kohlman et al. | 442/32 |

* cited by examiner

*Primary Examiner* — Stephen Avila

(57) ABSTRACT

A structural component for a ship hull has a metal element, an electro-conductive element, and a non-conductive element which disconnects the metal element from the electro-conductive element so as to prevent an electrical contact of the electro-conductive element with the metal element.

12 Claims, 3 Drawing Sheets

STRUCTURAL COMPONENT FOR PRODUCING SHIP HULLS, SHIP HULLS CONTAINING THE SAME, AND METHOD OF MANUFACTURING THE SAME

BACKGROUND OF THE INVENTION

The present invention relates to a structural component for producing hulls for ships, to a ship hull containing the same, as well as to a method of manufacturing of the material and the ship hull.

It is known to use for construction of ship hulls fiber-reinforced plastics which are generally corrosion resistant. It has been however recognized that plastics reinforced with carbon fibers for enhancing structural efficiency of ship hulls can induce galvanic corrosion in attached metal structures or metal fasteners.

It is therefore believed to be desirable to provide materials and/or structural components used for making ship hulls, which eliminate the above mentioned disadvantages.

SUMMARY OF THE INVENTION

It is therefore an object of the present invention to provide a structural component for a ship hull, a ship hull, and a method of manufacturing the same, which are further improvements of the existing solutions of this type.

In keeping with these objects and with others which shall become apparent hereinafter, one feature of the present invention resides, briefly stated, in a structural component for a ship hull which includes a metal element; an electro-conductive element; and a non-conductive element which disconnects said metal element from said electro-conductive element so as to prevent an electrical contact of said electro-conductive element with said metal element.

When the structural component is formed in accordance with the present invention and used in a ship hull, galvanic corrosion is prevented, so that conductive light-weight polymer matrix composite materials can be used and substantial weight saving of hull structures which is critically important for high-speed vessels can be achieved.

The metal element can have a surface facing said electro-conductive element, while said electro-conductive element has a corresponding surface facing said metal element, and wherein said non-conductive element is located between said surfaces.

Stitching means can be provided for connecting said electro-conductive element with said non-conductive element and increasing resistance of said electro-conductive element and said non-conductive element to delamination.

The metal element can have a tip and filler at said tip in which said non-conductive element is introduced for increasing load-bearing capability of the material.

An additional external non-conductive element can cover said electro-conductive element and said non-conductive element and protecting the same from possible local impacts.

The electro-conductive element can have a portion of a reduced cross section, while said non-conductive element can be located between said reduced portion of said electro-conductive element and said metal element.

On the other hand, the electro-conductive element can have a substantially uniform cross section within the multi-material structural component and beyond that, and said non-conductive can be located between a portion of said electro-conductive element on the one hand, and said metal element on the other hand.

The metal element can include metal lap plates overlapping a portion of said electro-conductive element. On the other hand the metal element can have a portion extending into an interior of said non-conductive element.

The structural component can have two opposite surfaces, and wherein both surfaces are substantially planar. Also, the material can have two opposite surfaces, and wherein one of said surfaces is substantially planar while the other of said surfaces is shaped.

The structural component can be provided in a local area of the ship hull, or it can form a whole hull panel.

The present invention also deals with a ship hull which is composed of the structural component specified hereinabove.

The present invention further deals with a method of manufacturing of the above specified structural component and of the ship hull which contains such a structural component.

The novel features which are considered as characteristic for the present invention are set forth in particular in the appended claims. The invention itself, however, both as to its construction and its method, together with additional objects and advantages thereof, will be best understood from the following description of specific embodiments when read in connection with the accompanying drawings.

DESCRIPTION OF THE PREFERRED EMBODIMENTS

Figure 1:
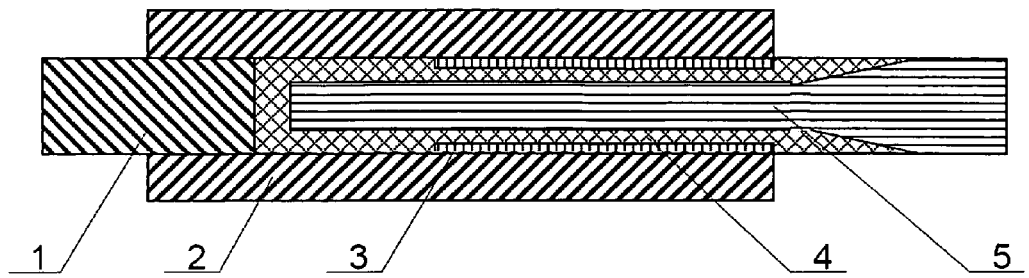
FIG. 1 is a view showing a new structural component for a ship hull in accordance with a first embodiment of the present invention.

FIG. 1 shows a first example of a new structural component for a ship hull in accordance with the present invention.

The structural component includes a metal element which can be composed of a metal middle plate (1) that embodies a part of a metal base hull structure, and metal lap plates (2) having protruded contact surfaces. Pins (3) protrude from the metal surfaces and are used to pin composite layers to the metal.

The structural component further has an electro-conductive element, such as for example carbon fiber-reinforced polymer or metal matrix composite, identified with reference numeral (5). In accordance with the present invention a non-conductive material (4) is arranged between the metal element, in this case between the metal lap plates (2) and the electro-conductive element (5) so as to prevent their electrical contact. The non-conductive element can be for example a glass fiber-reinforced polymer, rubber or ceramic matrix composite.

In the subsequent figure the same components of the inventive structural component will be identified with the same reference numerals.

Figure 2:
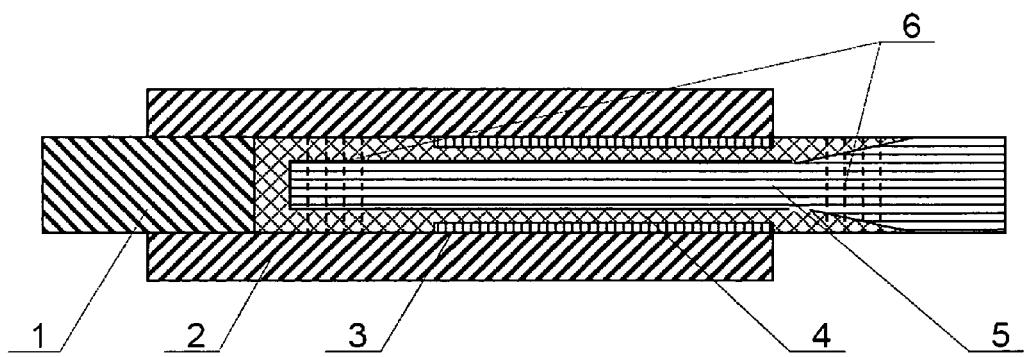
FIG. 2 is a view showing a structural component for a ship hull in accordance with a second embodiment of the present invention.

FIG. 2 shows the structural component in accordance with the present invention, which is provided with stitching (6). The stitching extends through portions of the electro-conductive polymer matrix composite element and non-electro-conductive polymer matrix composite element (5, 4), beyond a metal protrusion area if any, and increases resistance of the above mentioned materials to delamination.

Figure 3:
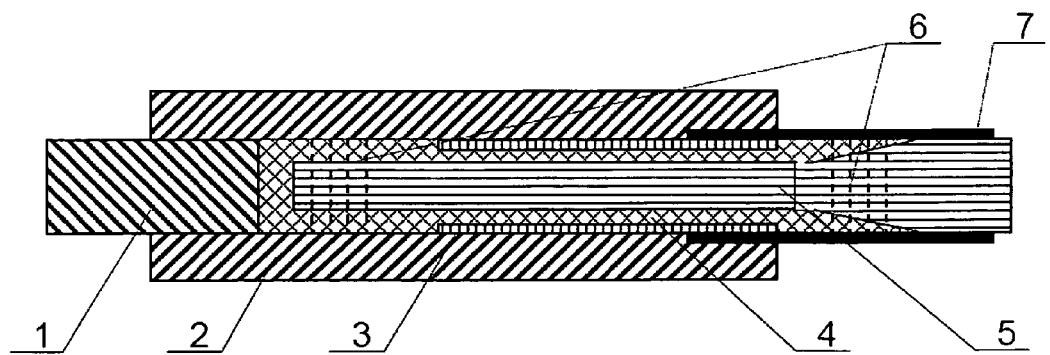
FIG. 3 is a view showing a structural component for a ship hull in accordance with a third embodiment of the present invention.

FIG. 3 discloses a further embodiment of the present invention. Here a fillet (7) is provided at a tip of the metal lap plate (2). As a result, stress concentration at the tip area is reduced, and the load-bearing capability of the inventive structural component is increased.

Figure 4:
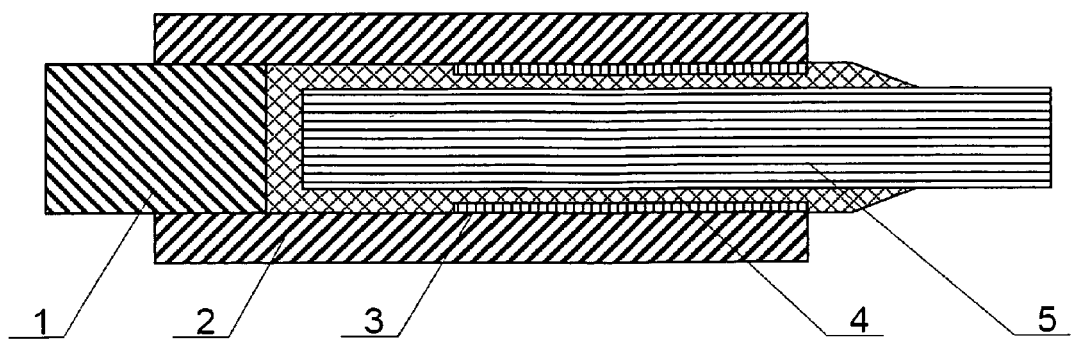
FIG. 4 is a view showing a structural component for a ship hull in accordance with a fourth embodiment of the present invention.

The structural component in accordance with the embodiment shown in FIG. 4 includes an additional external non-conductive element or layers (8) which protect the structural component from possible local impacts in transit to a ship hull surface. The additional external non-conductive layers (8) can extend over the electro-conductive element (5) and also over the non-conductive element (4).

Figure 5:
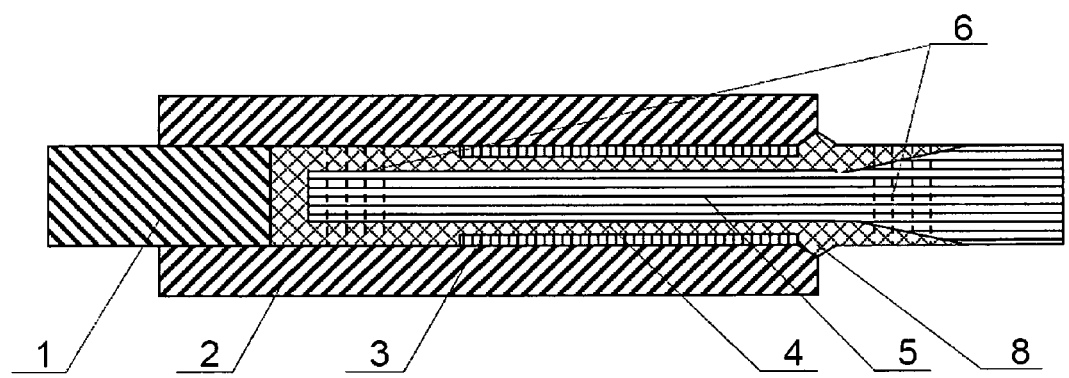
FIG. 5 is a view showing a structural component for a ship hull in accordance with a fifth embodiment of the present invention.
Figure 6:
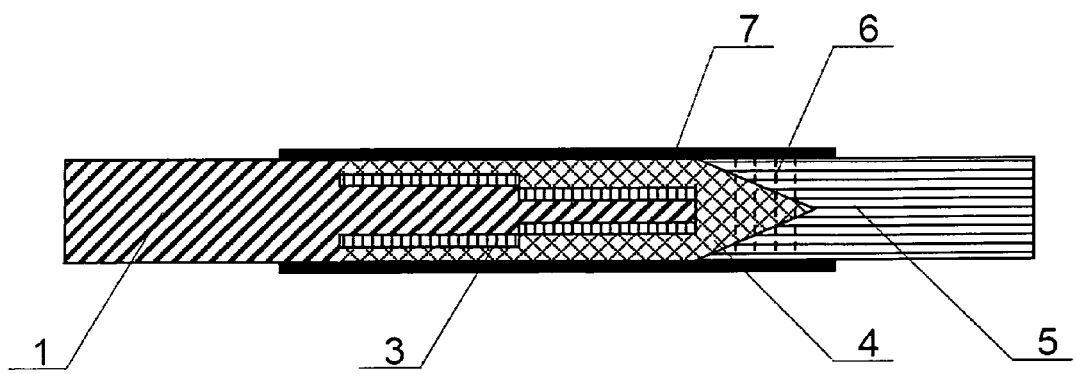
FIG. 6 is a view showing a structural component for a ship hull in accordance with a sixth embodiment of the present invention.

In the embodiment shown in FIGS. 1-4, an end portion of the electro-conductive element (5) has a reduced thickness so as to provide space for accommodation of the non-conductive element (4) to be located between the reduced portion and the metal lap plates (2). In contrast, in the embodiment shown in FIG. 5, the electro-conductive element (5) has a constant thickness, and the thickness of the electro-conductive element (5) in a transition area is therefore locally increased to provide proper robustness.

In accordance with a further embodiment of the structural component in accordance with the present invention, the metal element has a metal plate with a reduced portion (2) which can be stepped and located at least partially in an interior of a non-conductive element (4). Here also, the additional external non-conductive element (8) is provided to protect the structural component from possible local impacts intrinsic to a ship hull operation.

Figure 7:
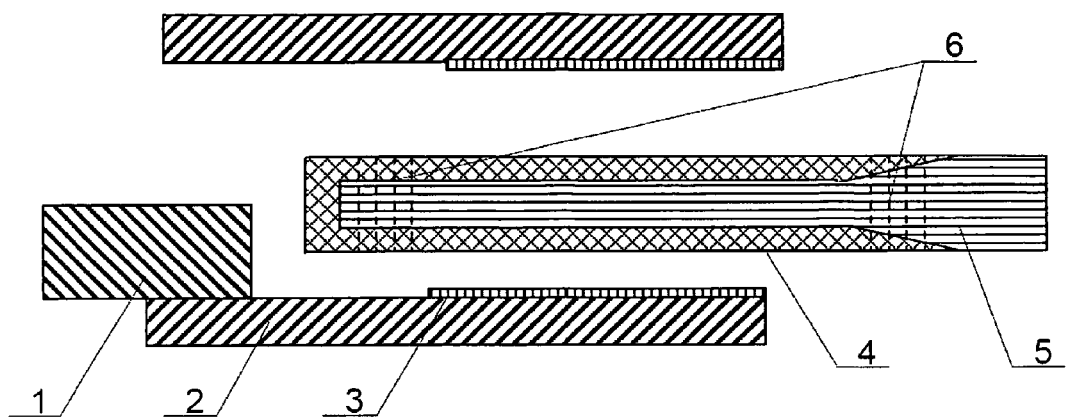
FIG. 7 is a view showing a structural component for a ship hull in accordance with a seventh embodiment of the present invention.

In the embodiment of FIG. 7, in contrast with the previous embodiments, the structural component at the hull is not planar. The structural component in accordance with the present invention can be also shaped. In FIG. 7 such a shaped material is illustrated, which has a flat lower surface and a shaped upper surface as an example. The structural component can be shaped to provide required performance parameters, for example it can be streamlined meeting the outer ship hull shape requirements.

In accordance with the present invention the above described structural component can constitute a limited transition area/joint of a ship hull. On the other hand, it can be expanded so as to form a whole hull panel.

The structural component in accordance with the present invention and a transition area/joint or the whole hull panel can be produced with substantially the same manufacturing process based on material processing techniques applicable for construction of large hull structures, either metallic or non-metallic, for example composite. Either open- or closed-mold material processing might be utilized accompanied with hand lay-up or robotic material placement while dealing with a material preform or a prepreg. In case of close-mold processing that is associated with several known environmental and material performance advantages, vacuum back molding (using either dry perform or dry or wet) or vacuum infusion processing are applicable. Any combination of those, as it is common for the composite ship building, is also possible.

Figure 8:
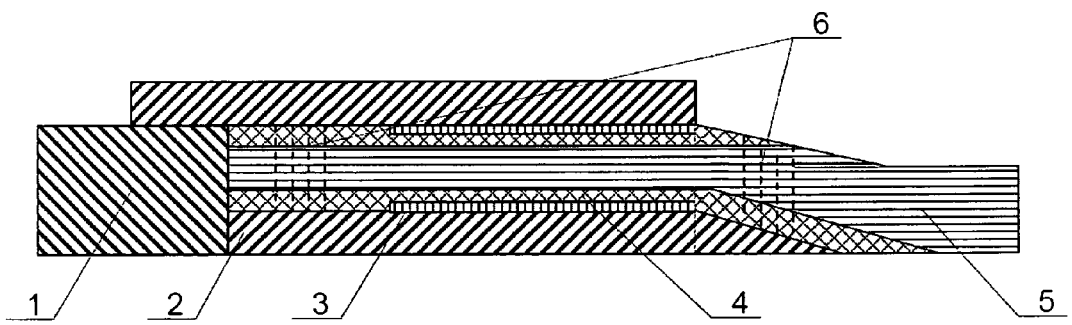
FIG. 8 is a view illustrating a manufacturing process for producing a new structural component and a ship hull with use of the new structural component.

FIG. 8 schematically illustrates a preassembled metal double-lap multi-material layup.

Upon assembly, the multi-material layup in case of the polymer matrix composite application is to be penetrated with polymer resin and cured forming a solid heterogeneous material. After that, the metal plates are to be joined to the base metal hull structure applying conventional welding, fastening and/or adhesive bonding. When welding is used caution needs to be used to prevent overheating of the neighboring polymer matrix composite if used.

In difference from conventional composite material processing applicable for full-composite construction, material processing shall combine two simultaneously-executed procedures, formation of a composite material/structure and consolidation of that with the metal components. Acting this way it will be possible to minimize fit up problems between the large metal and composite details being assembled into a hybrid structure to eliminate secondary bonding from the joint, reducing labor operations and avoiding lowered structure performance and to provide proper repeatability and predictability of the material quality within the material being manufactured.

Altogether these performance traits are to ensure integrity, serviceability, and reliability of structural component required for a hybrid hull.

Specifically, the following principle processing steps should be performed regarding the metal double-overlap material corresponding to FIG. 8:

Form a compound layup of fiber materials be that dry perform or dry or wet prepreg which includes both conductive and non-conductive plies of continuous filament mat, woven fabric, and/or unidirectional fibers at alternated orientation positioning non-conductive plies outwards.

Stitch the formed layup (if required) beyond the area subjected to pinning as shown in FIG. 2.

Place metal (lower) lap plate with protruded surface up into the mold.

Lay down the fibers layup being prepared over the metal plate in the mold.

Push the fiber layup against the protruded metal surface providing a firm contract between the fiber material and the metal base surface beyond the pins.

Place another (upper) lap plate over the fiver plies facing the fiber material with protruded metal surface.

Push the upper lap plate against the fiber material until getting the firm contact between those two.

Clamp the lap plates squeezing the stack of the fiber material.

Joint the metal lap and middle plates, applying a conventional metal joining technique such as fastening, welding, adhesive bonding or a combination of those; if welding process is a choice, use caution and/or temperature control to prevent/minimize melting of the fiber material and/or ignition of the resin within wet or prepreg fiber laminate as that is present.

Release the clamps.

Infuse the resin, if dealing with a dry fiber perform.

Cure the resin.

Assorted material/design/technology options of the structural component are capable to satisfy the requirements of structural efficiency, corrosion resistance and cost moderation. Basic options include either metal or composite double-lap layup as it is shown in FIGS. 1-5 might be employed suitably for specificity or of a particular application; metal interface with non-conductive polymer matrix composite is profiled with protruded pins like those in Comeld-2 joint [1-4], the pins penetrate into composite plies adjacent to the metal and transversely reinforce those providing mechanical locking between the metal and composite in addition to the adhesive bonding.

A wide assortment of metal grades is relevant. These include, but are not limited to marine grade steel alloys, such EH-36/DH-36 (ASTM A945 Grade 65) and their naval analogues, such as HLSA-65 steel alloy, marine grade stainless steel alloy, such as AL-6XN, stainless steel cast Ca6 nm, super duplex alloy (e.g. Sandvik 2205), nickel aluminum bronze C95800, titanium alloys, among possible others.

Continuous fiber-reinforced (glass, carbon and aramid) polymer matrix composites, based on a polymer resin, such as toughened vinyl ester (VE) and/or epoxy resins, are exemplified candidate materials for composite laminates of multi-material transition structure. Unidirectional fiber material alternated in-plane orientation, 2D and/or 3D woven fabric and/or (veil) mat represent the fiber material options. The heterogeneous fiber material layup might be stitched as that is illustrated in FIG. 2 to increase resistance of the composite laminate to delamination.

Depending on application, the structural component might be produced either for a limited material transition/joint area or be expanded up to a whole hybrid panel/section/hull construction as needed. In particular, that could be either plane or shaped to satisfy any shape requirements, e.g., be streamlined at the outer hull surface.

The structural component is to be placed within a hybrid structure in areas where metal structural components are transitioned to electro-conductive polymer matrix composite with high stiffness and/or high strength properties which can produce significant weight savings.

The structural component can be used for high-speed surface vessels with a hybrid hull comprising metal and lightweight polymer matrix composite structures. The new structural component can be used for bow and/or stern of primarily metal hull, deck house, bulkheads, foundations, waterjet inlet tunnel and/or housing, nozzle of an air propeller. The structural component can be also used for submarine structural applications, such as sonar dome, stabilizer, sail, all mounted on the primarily metal hull.

Aside from the shipbuilding, the invention is applicable and potentially beneficial for assorted land/air vehicles, towers and blades of wind turbines, off-shore floating platforms, both wet and dry gap crossing bridges, among others.

A two-material (metal-composite) transition structure with either non-conductive polymer matrix composite (for operation in electrolytic environment) or conductive polymer matrix composite (for operation in non-electrolytic environment) can also be constructed employing design and manufacturing procedure similar to the given above. Fastening using non-conductive fasteners (instead or additionally to the pinning) might be also applied to provide through thickness transverse reinforcement of the multi-material layup.

It will be understood that each of the elements described above, or two or more together, may also find a useful application in other types of constructions differing from the types described above.

While the invention has been illustrated and described as embodied in a material for producing ship hulls, ship hulls, and method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

REFERENCES

1. Shkolnikov, V. M., Dance, B. G. I. et al. Advanced Hybrid Joining Technology, *Proceedings of the ASME 28th International Conference on Ocean, Offshore and Artic Engineering*, OMAE2009, Honolulu, Hi., May 31-Jun. 5, 2009, 10 p.
2. Khodorkovsky, Y., Mouring, S., Shkolnikov, V. M., Advanced Hybrid Joining Technology, *Proceedings of the 1st International Conference on Lightweight Design for Marine Structure*, Glasgow, UK, Sep. 7-8, 2009, 10p.
3. Comeld™—Composite to Metal Joining. TWI Presentation, January 2005, http://www.twi.co.uk/j32k/unprotected/pds/comeldJan05.pdf.
4. Dance, B. G. I., Kellar, E. J. C., 2004, Workpiece Structure Modification, International Patent Publication WO 2004/028731 A1.
5. Buxton, A. L., Dance, B. G. I., Surfi-Sculpt™—Revolutionary Surface Processing with an Electron Beam, TWI Ltd. Cambridge, UK, ASM International ISEC Congress, St. Paul, Minn., USA, 1-3 Aug. 2005.
6. Barsoum, R. G. S., Hybrid Ship Hull, U.S. Pat. No. 6,386,131, 14 May 2002.
7. Barsoum, R. G. S., Hybrid Ship Hull, U.S. Pat. No. 6,941,888, 13 Sep. 2005.
8. Critchfield, M. O., Kuo, C. T., Nguyen, L. B., 2003, Hybrid Hull Construction for Marine Vessels, U.S. Pat. No. 6,505,571 B1.
9. Messier, R. W., Jr., Joining Composite Materials and Structures: Some Thought-Provoking Possibilities, *Journal of Thermplastic Composite Materials*, Vol 17, No. 1, 2004, pp. 51-75.
10. Barsoum, R. G. S., *Hybrid Composite and Metallic Hulls—Stealth, Strength and Durability*, ASNE Ships and Ship Systems Technology Symposium (S3TS), NSWCCD, Nov. 13-14, 2006, S3TS Symposium Proceedings.
11. Weitzenböck, J. R. and McGeorge, D., BONDSHIP project guidelines, ISBN 82-515-0305-1, 2005, Det Norske Veritas, 254 p.
12. Anderson E. A., Henry, R., Shkolnikov, V. M., Non-Linear FEA of Combined Joint of Metal and Non-Metal Structure Components, *Proceedings of ABAQUS User's Conference*, Newport, R.I., May 29-31, 2002, pp. 1-14.

The invention claimed is:

1. A structural component for a ship hull, comprising a metal element; an electro-conductive element; and a non-conductive element which is located between said metal element and said electro-conductive element, is adhesively bonded with said metal element, and connects said metal element with said electro-conductive element so as to prevent an electrical contact of said electro-conductive element with said metal element, said metal element having a plurality of pins penetrating into said non-conductive element and providing a transverse reinforcement of said non-conductive element and also a mechanical locking between said metal element and said non-conductive element in addition to adhesive bonding therebetween.

2. A structural component for a ship hull as defined in claim 1, wherein said metal element has a first surface facing said electro-conductive element, while said electro-conductive element has a second surface facing said metal element, and wherein said non-conductive element is located between said surfaces.

3. A structural component for a ship hull as defined in claim 1; further comprising stitching means provided in an area beyond said pins, connecting said electro-conductive element with said non-conductive polymer matrix composite element and increasing resistance to said electro-conductive element and said non-conductive element to delamination.

4. A structural component for a ship hull as defined in claim 1; further comprising an additional external non-conductive element surrounding said electro-conductive element and said non-conductive element and protecting the same from possible local impacts.

5. A structural component for a ship hull as defined in claim 1, wherein said metal element includes metal lap plates surrounding a portion of said non-conductive element, at least one of said metal lap plates being provided with said pins.

6. A structural component for a ship hull as defined in claim 1, wherein said metal element includes metal lap plate surrounding a portion of said non-conductive element and having a bevel which is filled with a material of said non-conductive element.

7. A ship hull, comprising at least a part composed of the structural component defined in claim 1.

8. A method of manufacturing a structural component for a ship hull, comprising the steps of providing a metal element; providing an electro-conductive element; arranging a non-conductive element between the metal element and the electrically conductive element, so as to connect said metal element with said electro-conductive element by adhesive bounding and to prevent an electrical contact of said electro-conductive element with said metal element; and providing on said metal element a plurality of pins penetrating into said non-conductive element and providing a transverse reinforcement of said non-conductive element and also a mechanical locking between said metal element and said non-conductive element in addition to adhesive bounding therebetween.

9. A method as defined claim 8; and further comprising stitching of said electro-conductive element in an area beyond said pins for connecting said electro-conductive element with said non-conductive polymer matrix composite element and increasing resistance to said electro-conductive element and said non-conductive element to delamination.

10. A method as defined in claim 8; further comprising arranging an additional external non-conductive element surrounding said electro-conductive element and said non-conductive element and protecting the same from possible local impacts.

11. A method as defined in claim 8, further comprising including in said metal element metal lap plates surrounding a portion of said non-conductive element, with at least one of said metal lap plates being provided with said pins.

12. A method as defined in claim 8, further comprising including in said metal element lap plates surrounding a portion of said non-conductive element and having a bevel which is filled with a material of said non-conductive element.

* * * * *